H. A. BALCOME.
ELECTRIC MOTOR OR GENERATOR.
APPLICATION FILED OCT. 24, 1910.
1,141,860.
Patented June 1, 1915.
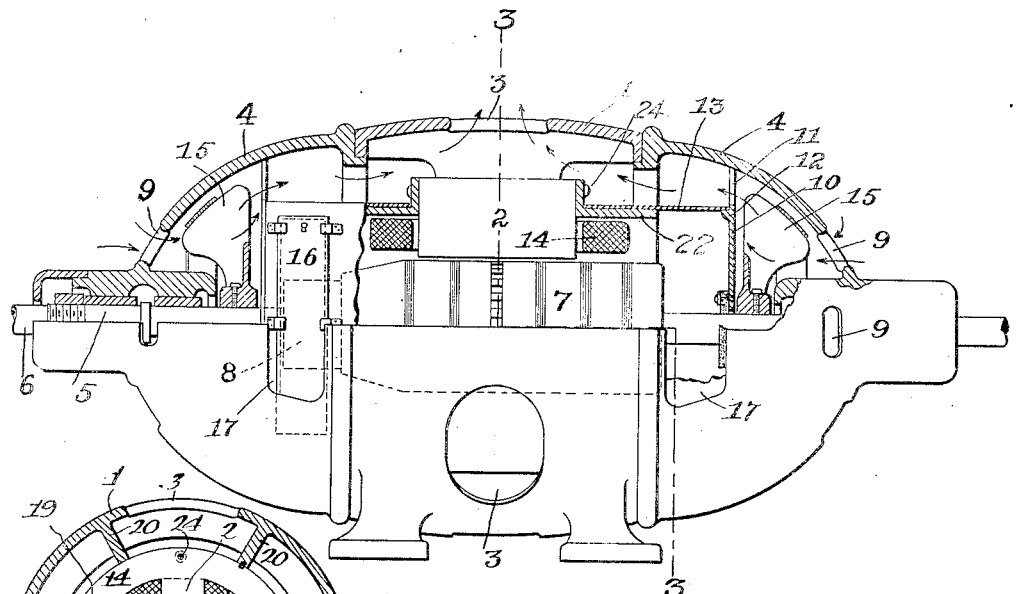
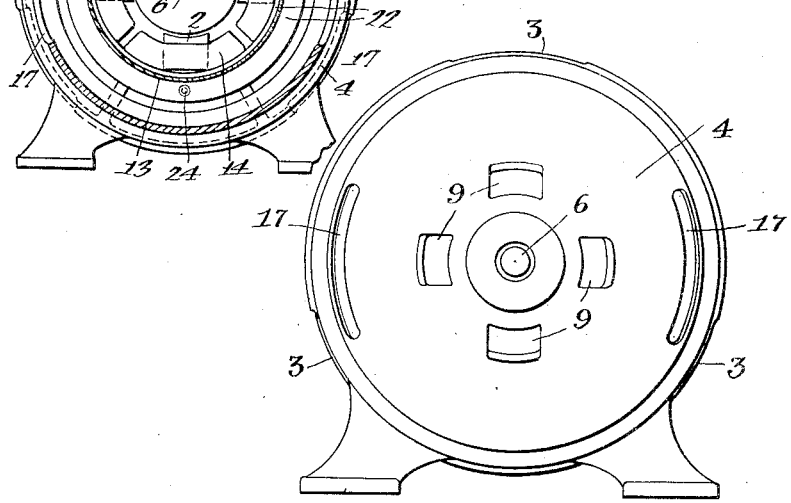
Witnesses:
Powell F. Hatch.
George E. Stebbins.
Inventor:
Herbert A. Balcome
by his Attorneys
Phillips Van Everen & Fish
Hiram Van Everen

UNITED STATES PATENT OFFICE.

HERBERT A. BALCOME, OF BOSTON, MASSACHUSETTS, ASSIGNOR TO THE HOLTZER-CABOT ELECTRIC COMPANY, OF BROOKLINE, MASSACHUSETTS, A CORPORATION OF MASSACHUSETTS.

ELECTRIC MOTOR OR GENERATOR.

1,141,860.      Specification of Letters Patent.      Patented June 1, 1915.

Application filed October 24, 1910. Serial No. 588,630.

*To all whom it may concern:*

Be it known that I, HERBERT A. BALCOME, a citizen of the United States, residing at West Roxbury, Boston, in the county of Suffolk and State of Massachusetts, have invented certain new and useful Improvements in Electric Motors or Generators; and I do hereby declare the following to be a full, clear, and exact description of the invention, such as will enable others skilled in the art to which it appertains to make and use the same.

The present invention relates to electric motors or generators, and more particularly to the dust- or moisture-proof types of such machines.

The operation of an electric motor or generator results in certain losses of energy which appears in the form of heat. It is well known that if this heat is allowed to become excessive it affects the reliability of the machine due to the deterioration of the insulating substances used. Such being the case, it is essential that the temperature of a generator or motor be kept within such limits that this insulating material will not be so affected as to injure the machine. Artificial cooling is commonly resorted to to keep down the temperature, the coils of the machine having air passages therethrough to allow for a constant circulation of air to carry away the heat. However, when such machines must be operated in an extremely dusty or moist atmosphere, this circulation of air through the machine is impossible, unless such air be thoroughly cleansed of its impurities, since the introduction of dust, such as from abrasives or moisture, into the working parts of the machine, is liable to injure them. This cleansing of the air is expensive and impracticable, and consequently when machines must be used under conditions of extreme dust or moisture, it is usual to make the outer casing of the machine dust-proof or water-tight and to so construct the working part as to keep down the heat losses in the machine. The size of the conductors must be increased to allow for a comparatively low current density therein, thus increasing the size of the machine. This increase in size means an increase both in first cost and in cost of repairs, and often renders the machine so bulky that it is not suitable for the work which it is expected to perform, as, for example, where it is desired to mount a motor upon a grinding or polishing machine. The inclosing frame must of necessity be strong enough to support the parts of the machine attached to it, and also to afford protection to them, especially where such machines are to receive rough usage. In such machines the heat must travel a comparatively long distance from the coils, where it is generated, to the inside of the inclosing case and then pass through this comparatively thick case before it can be dissipated from the outer surface thereof.

The object of the present invention is the production of a dust-proof or moisture-proof dynamo-electric machine from which the heat may be readily dissipated.

With this object in view, the present invention contemplates a dynamo-electric machine having an open outer supporting frame, and a closed inner casing which surrounds those working parts of the machine which it is desired to protect from dust or moisture and which inner casing is constructed of thin heat-conducting material to allow the heat to readily pass therethrough and be dissipated by the outside air which has free access to its surface. Since this inner casing surrounds only the working parts of the machine, the heat generated therein has but a comparatively short path in reaching the inner casing, which, since it has no supporting function, may be of very thin material for the easy conduction of heat.

The outer surface of the inner casing is preferably cooled artificially by a stream of air drawn between it and the outer casing or frame of the machine. This circulation of air will cool and greatly increase the efficiency of the inner casing in dissipating heat, and will also cool such parts of the interior of the machine as are not inclosed within the inner casing and which will have more or less heat conducted to them from the parts within the inner casing. By providing the machine with an inner casing and artificial air cooling means, the advantages of both a dust- or moisture-proof machine and an artificially cooled machine are simultaneously obtained, and both the size and cost of construction of the machine kept down. In a machine of this type the heat generated ordinarily increases in amount as the speed of the machine increases, so provision is preferably made so that the air circulation shall be increased simultaneously with the speed of the machine.

With the above objects in view, the present invention consists in the electric motor or generator hereinafter described, and particularly defined in the claims.

In the drawings, Figure 1 is a side view, taken partly in section, of a motor embodying the preferred form of the invention; Fig. 2 is an end elevation of the motor, and Fig. 3 is a section on the line 3—3, Fig. 1.

The illustrated embodiment of the invention is described as follows:—

The frame of the machine consists of a supporting drum 1 to the interior of which is secured the field magnet 19. The pole pieces 2 are formed by inwardly projecting poles on a ring of the field magnet 19. The ring is supported by a number of inwardly projecting flanges 20 on the drum 1. The ring and the inwardly projecting supporting flanges 20 form a construction which is old and well-known and which constitutes no part of the present invention. The drum 1 is provided with a number of air passages 3 through it. Secured to each end of the drum are end bearing caps 4 in which is journaled at 5 the driving shaft 6 which carries the armature 7 and its commutator 8. The outer end of the end caps 4 are provided with a number of air passages 9. In each end bearing cap is a diaphragm 10 through which the shaft 6 passes in a dust-proof bearing of felt or other suitable packing. Each diaphragm 10 is provided around its periphery with a number of openings 11 for the passage of air. Inside of the region of the openings 11 each diaphragm is formed with an annular flange 12 which engages and forms a dust-joint with the end of a thin metal drum 13, suitably secured to the frame 1. The drums 13 are secured in a dust-proof manner to the sides of the ring of the field magnet 19 outside of the field coils 14. As shown in Fig. 1, the drums 13 are placed one on either side of the ring of the field magnet 19. Each drum is slipped over an annular collar 22 of L-shaped cross section which is secured on the side of the field magnet 19 by means of bolts 24. When the motor is assembled, the field magnet the two diaphragms 10 and drums 13 form a dust-proof casing covering the armature and field coils which constitute the parts of the machine which it is desired to protect from dust or moisture. The diaphragms 10 and drums 13, which form the inner coverings, are constructed from sheet metal made as thin as practicable to allow for the easy conduction of heat therethrough. The end caps 4 are made of such dimensions as will allow sufficient room therein for air impellers 15 which are mounted upon the driving shaft 6 outside of the diaphragms 10.

The air impellers 15 are shown as fans and may be of either the centrifugal type or the propeller type, but preferably a combination of the two. When the shaft is rotated the fans 15 draw air through the openings 9 and blow it over the diaphragms 10 and drums 13, after which it passes out through the openings 3. The circulation of the air is indicated by arrows in Fig. 1. The outer parts of the field magnet, as shown in Fig. 1, are exposed to the circulation of the air flowing into the drum 1 from both ends and passing out through the openings 3. To permit access to the brushes and brush-holders, sliding doors 16 are placed upon the drum surrounding the commutator. These doors are of course made dust-tight and preferably come opposite openings 17 through the end caps which allow easy access to the brushes and commutator. The openings 17 are closed by rough casting covers which are not necessarily dust-tight.

The armature is provided with air conducting ducts which will cause a forced circulation of air through the armature to carry the air from the heated armature windings to the inside of the diaphragms 10 and drums 13 which are kept cool by the circulation of air on their outside and which will dissipate the heat brought to them by the current of heated air from the armature. The thinness of the internal dust-proof casing allows for a ready dissipation of heat, and the current of cool air passing over the exposed parts of the field magnet which are external to the dust-proof casing also helps to carry away the heat which is communicated to the field magnet cores from their coils.

The present invention is not limited to the illustrated embodiment, but is equally applicable to all other forms of dynamo electric machinery which it is desired to protect against either dust or moisture, or both. Where, in the foregoing description of the invention, or in the following claims, the word dust-proof is used, it is intended to define a construction which is substantially dust- or moisture-proof or is both dust- and moisture-proof. In the claims the words "field" and "armature" are not intended to limit the invention to machines in which the field is stationary and the armature rotary.

Having thus described the invention, what is claimed is:

1. An electric motor or generator having, in combination, an outer supporting frame, a stator provided with pole pieces and field coils for the pole pieces, an armature, an armature shaft, and thin-walled heat-conducting inner coverings which, in conjunction with the stator and the shaft, inclose the inner ends of the pole pieces, the armature and the field coils, substantially as described.

2. An electric motor or generator having, in combination, an outer supporting frame, a stator provided with pole pieces and field coils for the pole pieces, an armature, an armature shaft, thin-walled heat-conducting inner coverings which, in conjunction with the stator and the shaft inclose the inner ends of the pole pieces, the armature and the field coils, and blowing means for causing a cooling circulation of air within the supporting frame and over the outer surfaces of the inner coverings, substantially as described.

3. An electric motor or generator having, in combination, an outer supporting frame, an armature supported by said frame, a dust-proof casing having thin-walled heat-conducting portions for covering rotating parts of the machine, and blowing means for causing a cooling circulation of air over the outer surface of the covering means, substantially as described.

4. An electric motor or generator having, in combination, an outer supporting frame, a field magnet and armature supported thereby, a dust-proof casing having thin-walled heat-conducting portions for covering rotating parts of the motor or generator, and blowing means for causing a cooling circulation of air over the outer surface of the covering means, substantially as described.

HERBERT A. BALCOME.

Witnesses:
ROY T. WELLS,
DOUGLAS CAIRNS.